Oct. 31, 1967    L. B. STEIN, JR    3,350,581
CONDITION-INITIATED CIRCUIT-CONTROLLING APPARATUS
Filed July 11, 1963    2 Sheets-Sheet 1

INVENTOR.
Laurence B. Stein, Jr.

BY Moses, Mc.Glew & Toren

ATTORNEYS.

INVENTOR.
LAURENCE B. STEIN, JR.
BY
MOSES, McGLEW & TOREN

United States Patent Office 3,350,581
Patented Oct. 31, 1967

3,350,581
CONDITION-INITIATED CIRCUIT-CONTROLLING
APPARATUS
Laurence B. Stein, Jr., Hingham, Mass., assignor to Sigma
Instruments Inc., a corporation of Massachusetts
Filed July 11, 1963, Ser. No. 294,382
14 Claims. (Cl. 307—117)

This invention pertains, in general, to circuit controllers of the kind wherein the control action is initiated in response to a physical condition (e.g., change in illumination, temperature, humidity, barometric pressure, etc.) and the control action is then intended to be continued for a definite duration of time by a switch mechanism; and, in particular, to an improved circuit controller wherein the control action is reinitiated when the physical condition reappears regardless of whether power interruptions have caused the switch mechanism to accumulate "lost time" thereby getting out of synchronism.

For example, there are known prior art circuit controllers wherein the control action is initiated daily, either at sunrise or dusk, by a photosensitive element, such as a photoelectric cell or a photoconductive cell. Once the control action is initiated it is intended to be continued for a predetermined duration of time by a continuously running electrical timer; i.e., a switch mechanism which maintains continuity and/or discontinuity between a voltage source and a load or circuit to be controlled. For example, in controlling street lights with such prior art controllers, the control action is such that the street lights may be turned off from sunrise until dusk and may be turned on from dusk until the next sunrise.

Such known prior art circuit controllers are seriously deficient in, among other things, their inability to provide proper control action initiation at the time of the next sunrise when power interruptions have occurred while the control action was being continuously effectuated by the electrical timer. Power interruptions cause the timer to accumulate "lost time"; i.e., accumulate time durations of the interruptions. Accordingly, the timer's continuous control action gets out of synchronism with respect to the instant of time at which the control action is intended to be re-initiated, at the next sunrise. Even when there has been no power interruption at all, it is possible that the electrical timer, which is comprised of a motor-driven set of contacts, will accumulate appreciable "lost time," thereby frustrating accurate and reliable control action. Unless a highly accurate electrical timer is used, appreciable "lost time," can accumulate. However, even an extremely accurate electrical timer will accumulate appreciable "lost time" when it is operated from a poorly regulated power source. For example, a synchronous motor timer mechanism operated from an A.C. source will accumulate appreciable "lost time" if the A.C. source frequency is poorly regulated. Also, a D.C. operated timer motor will be subject to speed variation and consequently accumulate appreciable "lost time" if the D.C. source voltage is poorly regulated. Often, such erroneous control initiation is thoroughly intolerable.

Accordingly, one object of the present invention is to provide a condition-initiated circuit controller which re-initiates control action at the intended time even though power interruptions have previously occurred.

Another object of the present invention is to provide a condition-initiated circuit-controller wherein a relatively inaccurate electrical timer may be used. The circuit controller functions to restart the timer periodically (e.g., daily) so that timer errors will not be accumulated for more than a minimum amount of time; e.g., if the timer is restarted daily, the greatest error would be that produced during one day.

Another object of the present invention is to provide a condition-initiated circuit controller employing a motor-driven timer mechanism, wherein the circuit controller functions relatively accurately and reliably even though the power source provided for operating the timer mechanism is poorly regulated.

Another object of the present invention is to provide a relatively simple, accurate, reliable and economical circuit controller which is adaptable for use in a wide variety of control applications.

Although, by way of illustration, the circuit-controlling action of the circuit controller of the present invention is hereinafter described as being initiated approximately at any desired predetermined time after sunrise, or sunset, and continued for a fixed duration of time, it is to be understood that the initiation of the circuit-controlling action is not limited to levels of light intensity. The circuit-controlling action may, according to the desired practical application, be initiated by predetermined levels of temperature, humidity, or barometric pressure, etc. More specifically, the control action of the circuit controller provided by the invention may be initiated by any slowly varying physical condition such as those hereinbefore and hereinafter set forth. In addition, it is to be understood that the circuit-controlling apparatus provided by the present invention is adaptable for applications other than the control of street lights. For example, it may be used for controlling the time, and duration, at and during which capacitors may be connected across a power source to improve the power factor of a power-consuming load. Similarly, the subject circuit-controlling apparatus may be employed to control when and for how long duration electric water heaters are to be operated. Many other useful control applications will occur to those skilled in the circuit or load-controlling arts.

According to one illustrative embodiment of the invention there is provided a controller for establishing continuity between a voltage source and a load, wherein capacitor means, being precharged from the voltage source, is enabled to discharge through the control coil of one electrically actuable switch means when a condition sensing element permits another electrically actuable switch means to establish continuity between the charged capacitor means and the control coil of said one switch means. The one switch means, being actuated by the discharge, starts an electrical timer which includes load contact means for establishing continuity, or discontinuity, between the load and voltage source for a predetermined duration of time and auxiliary contact means for deenergizing said one switch means. If the electrical timer completes its continuing control action when there exists a physical condition which is the same as when the condition sensing element permitted the initial actuation of said other switch means, the other switch means prevents the capacitor means from being recharged from the voltage source. As a consequence, said one switch means cannot be actuated and, in turn, restart the electrical timer. Not until the physical condition changes to another predetermined level can the other switch means function to allow the capacitor means to recharge. Subsequently, when the desired initiating physical condition reappears, the recharged capacitor is permitted to discharge, again, thereby repeating the aforementioned operational cycle.

According to another illustrative embodiment of the invention there is provided a controller for establishing continuity between a voltage source and a load, or circuit, to be controlled wherein an electrically actuable switch means is enabled to either connect or disconnect an electrical timer with a voltage source to connect, or disconnect, the load or circuit to be controlled, with the voltage source. A condition-sensing element is provided to enable the switch means to be actuated when a predetermined physical condition occurs. Also provided according to this embodiment of the invention are selector switch means and an auxiliary set of timer contacts. The auxiliary set of timer contacts functions to stop the timer when the switch means is deenergized in response to the activity of the condition sensing element. The selector switch means can be operated manually to restart the timer whenever the physical condition necessary to actuate the switch means next reappears.

According to another illustrative embodiment of the present invention there is provided a controller for establishing continuity between a voltage source and a load, or circuit to be controlled, wherein a condition sensing element actuates a switch means in response to the appearance of a predetermined physical condition. The switch means being so operated starts an electrical timer which controls the duration of time during which a load or circuit to be controlled is connected to, or disconnected from, a power source.

According to another embodiment of the present invention there is provided a controller for establishing continuity between an alternating voltage source and a load to be controlled wherein rectifier means are provided for enabling energization of a plurality of sensitive switch means, such as relays, connected in series with a condition responsive element. One relay will, for example, start the control action at dawn, and another relay will prevent restarting of the control circuit during daylight hours subsequent to dawn if there has been an intervening power interruption to cause the control to get out of synchronism.

The various features of novelty which characterize the invention are pointed out with particularity in the claims annexed to and forming a part of this specification. For a better understanding of the invention, its operating advantages and specific objects attained by its use, reference should be made to the accompanying drawings and descriptive matter in which there are illustrated and described preferred embodiments of the invention.

Figure 1:
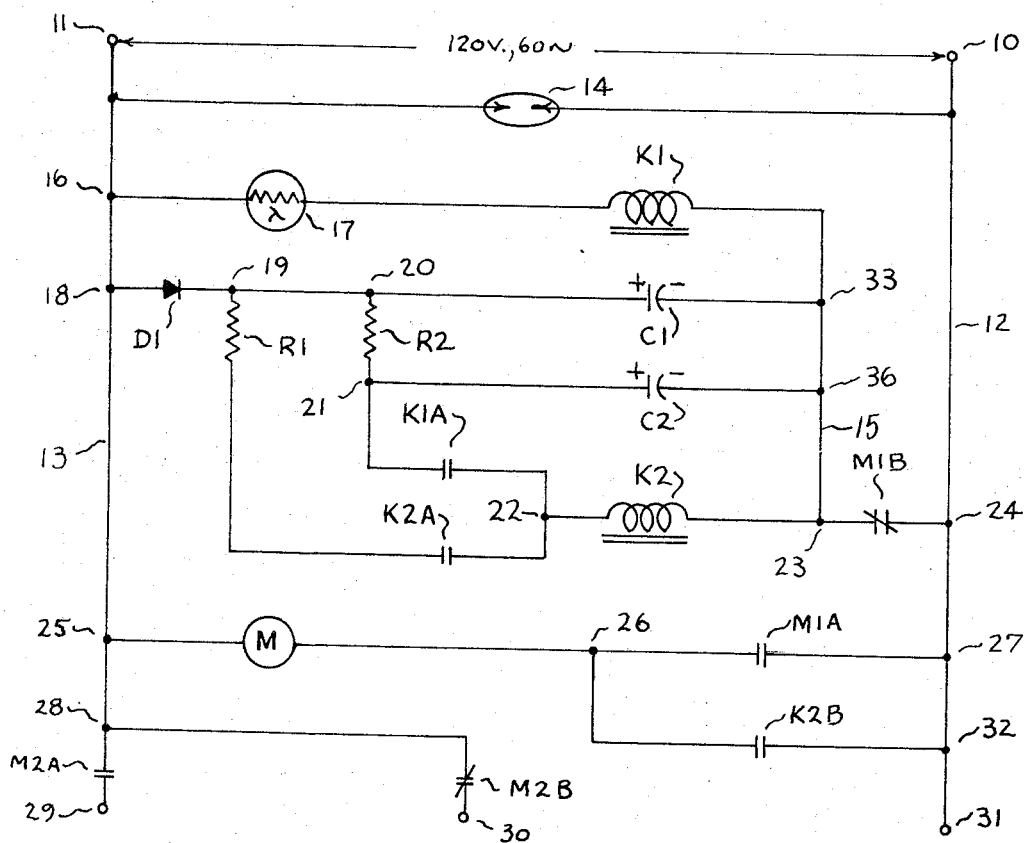
FIG. 1 is a schematic diagram of the circuit controller according to the invention.

As shown in the drawing, there is connected between the terminals 10 and 11 a source of alternating voltage; for example, 120 volts at a frequency of 60 c.p.s. Connected to the terminals 10 and 11, respectively, are the main conductors 12 and 13. Connected across the terminals 10 and 11, and the main conductors 12 and 13, is the lightning arrester 14 which, during periods of electrical surges, functions to shunt high currents away from other leads and components of the controller of the present inventi o.nAs is well known, the lightning arrester 14 may be comprised of Thyrite material; Thyrite having the characteristic electrical property of presenting a low impedance to a high voltage surge impressed thereacross and an extremely high impedance to normal circuit voltages, such as 120 volts. A Thyrite lightning arrester has been shown for purposes of illustration. However, it is to be understood that any commercially available lightning arrester suitable for the purpose (if required according to the nature of the control application) may be used. For example, an air-gap type lightning arrester may be used.

A third conductor 15 is connectable to main conductor 12 by timer contacts M1B, when these contacts are closed. As illustrated in FIG. 1, the contacts are normally closed. Conductor 12 includes junction points or terminals 24, 27, 32 and 31, and conductor 13 includes junction points or terminals 16, 18, 25 and 28. Correspondingly, the third conductor 15 includes junction points 33, 36 and 23.

A photocell 17 and a relay control coil K1 are connected in series with each other between terminals 16 and 33. The photoconductive cell 17 may, for example, be comprised of a cadmium sulfide film situated between metallic electrodes on an insulating base; e.g., an RCA type 7163 CdS cell.

A diode D1, which may be a germanium diode, and a capacitor C1 are connected in series with each other between terminals 18 and 33. Between diode D1 and capacitor C1, there are junction points or terminals 19 and 20. A high resistance element R2 is connected between terminal 20 and a terminal or junction point 21, and a second capacitor C2 is connected between terminal 21 and terminal 36. A resistor R1 and normally opened relay contacts K2A are connected in series between terminal 19 and a terminal or junction point 22, the normally opened contacts K2A being transferred to a closed condition upon energization of the relay control coil K2. As illustrated, the relay control coil K2 is serially connected between the terminals 22 and 23, and thus in series with its normally opened contacts K2A. The normally opened contacts K1A, controlled by control coil K1, are connected between terminals 21 and 22 and thus in series with the relay control coil K2. When coil K1 is energized, contacts K1A are transferred to the closed condition.

As shown, there is provided a timing mechanism comprising the motor element M and cam actuated contacts M1A (normally-open), M1B (normally-closed), M2A (normally-open), and M2B (normally-closed). As illustrated, the normally-closed contacts M1B are serially connected between terminals 23 and 24. The normally-open contacts M1A are connected in series with motor element M at a junction point 26, and the series circuit including motor element M and contacts M1A is connected between terminals 25 and 27. Normally opened contacts K2B controlled by relay coil K2 are connected in parallel with contacts M1A and in series with motor element M, as by being connected between terminals 26 and 32. Normally opened timer contacts M2A are connected in series between terminal 28 and an output terminal 29, and the normally closed timer contacts M2B are connected in series between terminal 28 and another output terminal 30.

Normally, the circuitry shown in FIG. 1 is in the condition illustrated; i.e., the various contacts associated with the relay coils and the motor operated timing mechanism are in the attitudes shown. More specifically, when the photoconductive element 17 is not subjected to sufficient light intensity (the photoconductor 17 is darkened), then the contacts K1A, K2A and K2B are open. Also, the contacts M1A and M2A are open, and the contacts M1B and M2B are closed. When the motor element M is energized, the contacts M1A and M2A close as the contacts M1B and M2B are caused to open. The capacitors C1 and C2, being connected as hereinbefore described, are charged as indicated by the plus and minus signs, by the action of the diode D1. As shown, the capacitor C1 is directly coupled in series with the diode D1. The capacitor C1 functions as a filtering or smoothing capacitor. But, the capacitor C2 is serially coupled with the diode D1 through the very high resistance element R2. (The electrical resistance of R2 is much greater than that of R1.)

When light intensity of a sufficient level illuminates the photoconductive cell 17, its conductivity increases, thereby permitting sufficient current to flow between terminals 24 and 16 to effectively energize relay coil K1. As coil K1 is energized, the contacts K1A associated therewith are closed, thereby enabling the capacitor C2 to discharge, rapidly, through the relay coil K2.

When relay coil K2 is thus pulse-energized by discharge from the capacitor C2 through the closed contacts K1A, the contacts K2A and K2B, being associated with the relay coil K2, close. Since the relay coil K2 was initially energized with a short duration pulse, energization thereof must be otherwise maintained. The closure of hold or latch contacts K2A maintains the energization of relay coil K2 via the series connection defined by the diode D1, the resistance element R1, the now closed contacts K2A and the normally closed contacts M1B of the timing mechanism. Simultaneously with the closure of the contacts K2A, the contacts K2B close and the motor M is started; the motor M being now connected across the terminals 25 and 32 by the now closed contacts K2B in series therewith.

Figure 2:
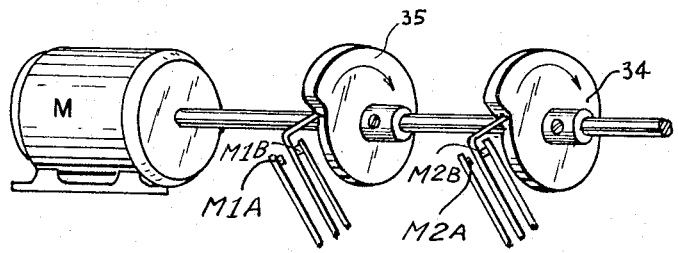
FIG. 2 is an illustration of the electrical timer used in the circuit controller.

The contacts M1A, M1B, M2A, and M2B associated with the timing mechanism are cam-operated; the cams 34 and 35 being driven by the drive motor M, as illustrated at FIG. 2. As soon as the cams 34 and 35 rotate through a small distance, the contacts M1A close and remain closed, thereby maintaining energization of the motor M through the series connected terminals 25, 26 and 27. Simultaneously, the contacts M1B open. When the contacts M1B open, relay coil K2 is deenergized and, as a consequence, the contacts K2A and K2B re-open. Accordingly, the capacitor C2 cannot recharge before contacts M1B release, even after contacts M1B reclose. If conditions are normal contacts M1B close during darkness at the expiration of the timer motor cycle, and capacitor C2 can charge through resistor R2. However, if there has been a power interruption and the motor cycle expires during daylight hours, capacitor C2 cannot charge while contacts M1B are open. When contacts M1B finally close the charge is held to a very low value of voltage due to the voltage divider action of the resistor R2 and the coil resistance of the coil K2.

After a complete rotation of the driven cams 34 and 35 (the duration of rotation being, for example, 20-23 hours), the contacts M1A open, thereby stopping the motor. Simultaneously, the contacts M1B are returned to their normally-closed condition. If, due to power interruption, the cams, driven by the motor M, complete a cycle of rotation while relay coil K1 is still energized (i.e., during daylight hours) due to the high conductivity of the photoconductive cell 17, the relay coil K2 cannot be pulse-operated because C2 is not charged and cannot recharge until contacts K1A reopen; the reopening of contacts K1A will occur during hours of darkness and permit capacitor C2 to recharge. When sunrise next appears, the photoconductor 17 allows relay coil K1 to be energized and repeat the cycle of operations hereinbefore described. In other words, rotation of the cam 35 must be completed before relay coil K1 is energized through the cell 17 at the next sunrise. It has been found that a period of from 20 to 23 hours for a complete rotation is satisfactory.

If contacts K1A are normally-closed contacts instead of normally-open, as shown, the control action is initiated at dusk rather than at dawn or sunrise. Advantageously, with the cricuit controller just described, regardless of the duration of power interruption, it requires a period of darkness followed by a period of light (or vice-versa) to restart the timer after its control action has terminated.

FIG. 1, one load (not shown) to be controlled can be connected between the terminals 29 and 31; another load (not shown) can be connected between terminals 30 and 31.

As is shown at FIG. 2, two cams 34 and 35 are secured to the rotatably driven shaft of the motor M. Cam 34 has the contacts M2A and M2B associated therewith; cam 35 has the contacts M1A and M1B associated therewith. Shortly after the motor M is started contacts M1A and M2A close and remain closed, due to rotating cam action, for a fixed duration of time. Similarly, contacts M1B and M2B open and remain open, due to rotating cam action, for the same fixed duration of time. As shown, each of the switch elements, one comprising the contacts M1A–M1B and the other comprising the contacts M2A–M2B, is a single-pole double-throw switch element. The operation of the load contacts M2A and M2B can be phased in any relationship with respect to the motor contacts M1A and M1B. In other words, M2A need not close with M1A, and M2B need not open with M1B. As is shown at FIG. 2, the cam wheels 34 and 35 may be separately adjusted with respect to each other and to the drive shaft of the motor M by means of the set screws on the hubs.

It will be appreciated by those persons familiar with control circuits that the element 17 may, according to the physical parameter to be sensed, be a device other than a photoconductive cell. It could be a pressure sensor, a thermistor, a humidity sensor, etc., depending on the particular control application. Accordingly, the circuit controller hereinbefore illustratively described could, according to an appropriate device 17, respond to any slowly varying physical parameter to initiate, continue and re-initiate control action. For example, device 17 could be a semi-conductor element which, as is known, has a negative resistance vs. temperature characteristic. Control action would be started at a first temperature level by the semi-conductor device and control action would be continued for a fixed duration of time by the electrical timer. If a power interruption has occurred during said time duration, and the timer finishes its cycle of control activity when the temperature, being a periodically varying parameter, has fallen to a second, lower level, the capacitors can recharge and initiate control action when the first temperature level reappears. Also, for example, the device 17 could be a metallic resistance thermometer having a positive temperature coefficient.

Figure 3:
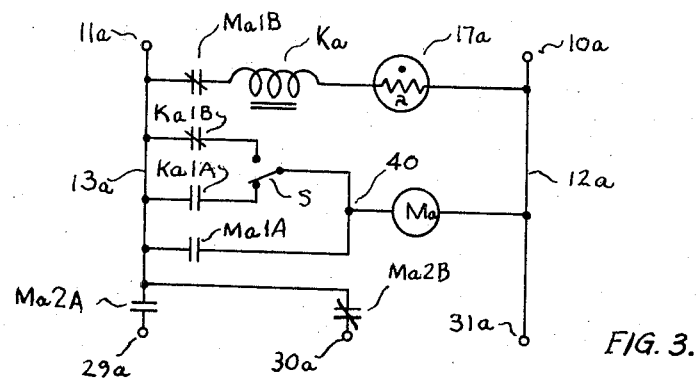
FIG. 3 is a schematic diagram of another embodiment of a circuit controller according to the invention.

Another embodiment of the present invention is illustrated at FIG. 3. As shown at FIG. 3, a source of supply potential (not shown) is intended to be impressed across the main conductors 12a and 13a at their respective terminals 10a and 11a. For example, a voltage supply of 120 volts, single-phase, 60 c.p.s. may be employed. One relay is provided. This relay is comprised of the coil Ka, the normally-open set of contacts Ka1A, and the normally-closed set of contacts Ka1B. Also as shown, there is provided an electrical timer comprising the drive motor Ma and the four sets of contacts Ma1A, Ma2A, Ma1B and Ma2B. As indicated at FIG. 3, the contacts Ma1A and Ma2A are normally-open contacts, the contacts Ma1B and Ma2B are normally-closed contacts. In the manner suggested in FIG. 2, the contacts Ma1A and Ma1B may be operated by one cam wheel, while the contacts Ma2A and Ma2B may be operated by another cam wheel. If synchronism is lost it may be regained in steps of four hours per day, in the case of a twenty hour motor operational cycle.

As shown, a first series circuit is connected between the conductors 12a and 13a. This series circuit includes the photoconductive cell 17a, the relay coil Ka, and the normally closed set of contacts Ma1B. Also provided is a second series circuit, connected between the conductors 12a and 13a, which is comprised of the timer motor Ma and the normally open set of contacts Ma1A. By manually operating the selector switch S, either of the contact sets Ka1A or Ka1B may be connected in parallel with the normally open set of contacts Ma1A. As shown, the motor Ma is connected between line 12a and junction 40. One load or circuit to be controlled (not shown) may be connected between the terminal 29a and the terminal 31a. Similarly, another load or circuit to be controlled (not shown) may be connected between the terminal 30a and the terminal 31a.

Assuming now that the selector switch S is in the position indicated in FIG. 3, when a light intensity of a predetermined level appears, the conductivity of the photoconductor 17a will increase. As a result, the relay coil Ka will be sufficiently energized to cause its associated relay contact sets to assume their operated conditions, i.e., the contact set KalA will close while the contact set Ka1B will open. As the contact set Ka1A closes, the timer drive motor Ma is started because this motor Ma is connected across the energized line conductors 12a and 13a, through the series-connected contact set Ka1A and the selector switch S. After the timer drive motor Ma starts to rotate, its associated sets of contacts assume their operated condition. The contact set Ma1B opens, thereby deenergizing the relay coil Ka. The deenergization of the relay coil Ka causes its associated sets of contacts Ka1A and Ka1B to revert to their normal condition, as shown at FIG. 3. However, just prior to the opening of the contact set Ma1B, the contact set Ma1A closes to provide electrical continuity of the motor Ma between the energized line conductors 12a and 13a. Actually, contacts Ma1A and contacts Ma1B are part of the snap action microswitch so that they operate substantially simultaneously. Also, any preselected time after the drive motor Ma begins to rotate, the load controlling contacts Ma2A and Ma2B assume their operated conditions; i.e., the contact set Ma2A closes while the contact set Ma2B opens.

Ordinarily, after the timer drive motor Ma starts to rotate, the contacts associated therewith are caused to assume their operated conditions and to remain in such operated conditions for the duration of the preset operational cycle of the drive motor Ma. The contact sets operated by the timer motor consequently will not revert to the condition illustrated in FIG. 3 even if a power interruption occurs prior to the end of the operating cycle of timer motor Ma.

Thus, assuming that the timer motor Ma has completed its cycle of rotation at a time when the hours of darkness are at hand (assuming that no power interruption has intervened), the timer motor Ma will not restart automatically until the appearance of dawn.

One particular advantage of using the circuit shown at FIG. 3 is as follows: If a power interruption occurs after the timer motor Ma has completed its cycle of rotation (before dawn) and a power interruption occurs subsequently but power is restored after dawn, the timer motor Ma will be restarted automatically by virtue of the increased conductivity of the photoconductor 17a when power is restored.

Another particular advantage of the circuitry shown at FIG. 3 is that the timer motor Ma may, optionally, be started at dusk by virtue of manually using the selector switch S to place the set of contacts Ka1B in series with the timer motor Ma. Also, the operation of the circuit can be made automatic when dawn appears, by leaving the selector switch S in the position shown in FIG. 3; i.e., as dawn appears, energization of Ka through the increased conductivity of the photoconductor 17a enables operation in the manner hereinbefore described.

Figure 4:
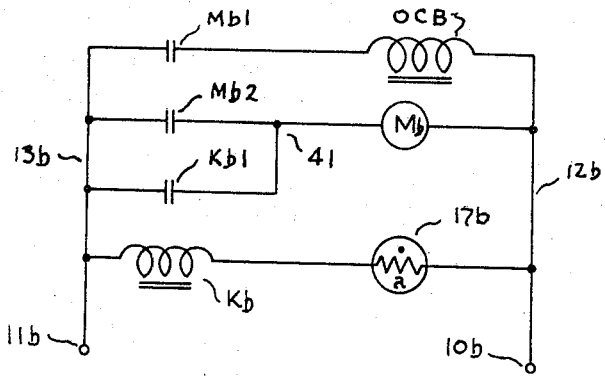
FIG. 4 is a schematic diagram of another embodiment of a circuit controller according to the invention.

Another embodiment of the present invention is illustrated schematically at FIG. 4. A source of supply voltage (not shown) is intended to be impressed across the main conductors 12b and 13b at their input terminals 10b and 11b, respectively. A relay Kb is provided which has a set of normally open contacts Kb1. Also provided is an electrical timer comprising the timer motor Mb and the normally open contacts Mb1 and Mb2. As shown, there is a first series circuit connected across the main leads 12b and 13b. This first series circuit is comprised of the photoconductor 17b and the relay coil Kb. Also provided is a second series circuit connected across the main conductors 12b and 13b; this second series circuit comprising the timer motor Mb and the normally open set of contacts Mb2 associated with the timer. As shown, the normally open set of relay contacts Kb1 is connected in parallel across the normally open contacts Mb2; i.e., between the junction 41 and the main conductor 13b. A load OCB, which may be the trip coil of an oil circuit breaker, is shown connected in series with the normally open set of timer contacts Mb1.

Operationally, when a sufficient level of light intensity appears, the conductivity of the photoconductor 17b increases, thereby allowing the coil Kb of the relay to become effectively energized. As a result, the normally open relay contacts Kb1 close, thereby energizing the timer motor Mb.

Shortly after the timer motor Mb begins to rotate, its normally open contacts Mb1 and Mb2 close. According to the circuit shown at FIG. 4, the timer will normally be started each day by the action of the photoconductor 17b in the manner hereinbefore described. In the event of a power interruption, the timer will, in the worst case, be restarted at dawn after but a few normal time duration cycles of timer operation; e.g., in a few days, at dawn.

Figure 5:
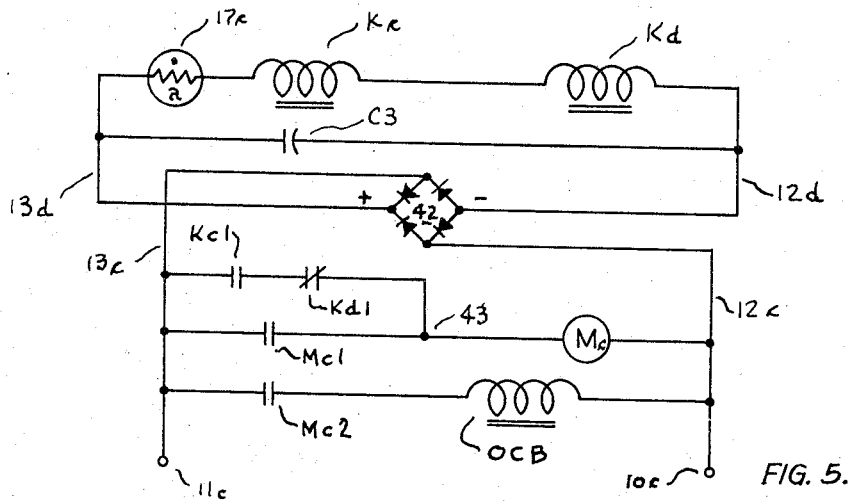
FIG. 5 is a schematic diagram of another embodiment of a circuit controller according to the invention.

Still another embodiment of the invention is illustrated schematically at FIG. 5. In FIG. 5 a source of A.C. power (not shown) is intended to be impressed across the main conductors 12c and 13c at the input terminals 10c and 11c, respectively, thereof. The load OCB which is, for example, the trip coil of an oil circuit breaker, is connected for energization by the A.C. supply source. As illustrated, a direct current control-initiating circuit is provided. For this purpose there is connected across the main conductors 12c and 13c the familiar full wave bridge rectifier circuit 42. The output conductors from this full wave rectifier 42 are the conductors 12d and 13d, as shown. Connected across the D.C. conductors 12d and 13d is the filtering capacitor C3. The purpose of the filtering capacitor C3 is to smooth the voltage impressed across the series circuit comprising the photoconductor 17c, the relay coil Kc, and another relay coil Kd. Also provided, as illustrated, is a timer comprising the timer motor Mc which has associated therewith the two normally-open contacts Mc1 and Mc2. As illustrated, the timer motor Mc and its associated contacts Mc1 and Mc2 are situated in the alternating current side of the control circuit. The timer motor Mc is connected between line 12c and the junction 43. The relay coil Kc has associated therewith the normally-open set of contacts Kc1 while the relay coil Kd has associated therewith the normally-closed set of contacts Kd1. The relay coil Kc of the relay and the relay coil Kd of the other relay are so chosen as to have different current operating and current releasing values. For example, the relay coil Kc may be selected to operate at a current level of 3 milliamperes and a release, or dropout, current of 2.6 milliamperes. The relay coil Kd may be selected to have an operating, or pull-in, current of 4 milliamperes, while its release or drop-out current may be set at 1.5 milliamperes.

Operationally, the relay Kc starts the timer motor Mc at dawn. As a consequence, the timer contacts Mc1 after the timer motor Mc begins to rotate, maintains the motor on, for example for 16 hours. The relay Kd having its normally-closed contact Kd1 in series with the contacts Kc1 and the motor Mc, prevents a restarting of the timer during daylight hours.

While specifiec embodiments of the invention have been shown and described in detail to illustrate the application of the inventive principles, it will be understood that the invention may be embodied otherwise without departing from such principles.

What is claimed is:

1. Apparatus for controlling the transmission of electrical power between a power source and a power consuming load, comprising: condition sensing means operable in response to a predetermined first level of physical condition and inoperable in response to a predetermined second level of physical condition; a switch operating means connected to said source in series with said sensing means and operable from the power source by said condition sensing means when said sensing means is operable; rectifying means and capacitor means connected in series with each other in a charging circuit connected to said source; a discharge circuit for said capacitor means controlled by contacts operated by said switch operating means, said capacitor means being chargeable from the power source when said condition sensing means and said switch operating means are inoperable; said capacitor means, when charged, dischraging through said discharge circuit when said condition sensing means and said switch operating means become operable as the physical condition changes from said second level to said first level; a further switch operating means connected in said discharge circuit and operable responsive to discharge of said capacitor means; and timing means connected to said source and including contact means coupled between the load and the source, energized responsive to closure of further contacts by said further switch operating means to control the connection between the load and source for a predetermined time duration.

2. Apparatus, as defined in claim 1, wherein said condition sensing means is a photosensitive electrical element.

3. Apparatus, as defined in claim 2, wherein said condition sensing means is a photoconductive element.

4. Apparatus, as defined in claim 1, wherein said condition sensing means in a resistance element, the electrical conductance of which changes in response to changes in temperature.

5. Apparatus, as defined in claim 1, wherein said condition sensing means responds to changes in temperature.

6. Apparatus, as defined in claim 1, wherein said condition sensing means is pressure sensitive.

7. Apparatus, as defined in claim 1, wherein said first mentioned switch means is an electromagnetically operable switch means.

8. Apparatus, as defined in claim 1, wherein said second mentioned switch means is an electromagnetically operable switch means.

9. Apparatus for controlling transmission of electrical power from a power source to a load, comprising, in combination, condition-sensing means having one state responsive to a first periodically recurring level of a physical condition; a timer having a first energizing circuit, said timer having an operating period less than the recurrence period of said physical condition level; first switch means controlled by said sensing means and included in said first timer energizing circuit, said switch means, responsive to said physical condition level effective on said sensing means, closing said first timer energizing circuit to start running of said timer; first timer contacts operated by said timer during running thereof and controlling connection of the load to said source, said timer closing said first contacts a predetermined time interval after starting of said timer and opening said first contacts a second predetermined time interval after starting of said timer; and a second energizing circuit for said timer means in parallel with said first energizing circuit and including contacts closed by said timer upon energization of the latter, said timer opening said last-named contacts at the end of said second predetermined time interval.

10. Apparatus for controlling transmission of electrical power from a power source to a load, comprising, in combination, condition-sensing means having one state responsive to a first periodically recurring level of a physical condition; a timer having an energizing circuit, said timer having an operating period less than the recurrence period of said physical condition level; first switch means controlled by said sensing means and including in said timer energizing circuit, said switch means, responsive to said physical condition level effective on said sensing means, closing said timer energizing circuit to start running of said timer; first timer contacts operated by said timer during running thereof and controlling connection of the load to said source, said timer closing said first contacts a predetermined time interval after starting of said timer and opening said first contacts a second predetermined time interval after starting of said timer; and including second switch means operatively associated with said timer and with said first switch means and operable, responsive to running of said timer, to render said first switch means ineffective to control said timer energizing circuit, said second switch means, at the end of the timer operating period, being operated by said timer to again render said first switch means effective to control said timer energizing circuit.

11. Apparatus for controlling transmission of electrical power from a power source to a load, comprising, in combination, condition sensing means having one state responsive to a first periodically recurring level of a physical condition; a timer having an operating period less than the recurrence period of said physical condition level; first switch means connected in a control circuit with said sensing means and included in said timer energizing circuit, said first switch means, responsive to said physical condition level effective on said sensing means, closing said timer energizing circuit to start running of said timer; first contacts operated by said timer during running thereof and controlling connection of the load to said source, said timer closing said first contacts a predetermined time interval after starting of said timer and opening said first contacts a second predetermined time interval after starting of said timer; second timer contacts in said energizing circuit in shunt with said switch means and closed responsive to running of said timer; third timer contacts included in said control circuit and opening said control circuit responsive to running of said timer and during the operating period of said timer to render said first switch means ineffective to control said timer energizing circuit, said third switch means being closed at the end of the operating period of said timer to again render said first switch means effective to control said timer energizing circuit.

12. Apparatus for controlling transmission of electrical power from a power source to a load comprising, in combination, a photocell having a low resistance state responsive to a first periodically recurring ambient light level and a high resistance state responsive to a second periodically recurring ambient light level; a timer having an energizing circuit, said timer having a first operating period less than the normal recurrence period of one of said ambient light levels; a relay, including an operating coil connected in series in a control circuit with said photocell and relay contacts included in said first timer energizing circuit; said relay, responsive to one of said ambient light levels effective on said photocell, closing said first timer energizing circuit to start running of said timer; first contacts operable by said timer during running thereof and controlling connection of the load to said source, said timer closing said first contacts a predetermined interval after starting of the running of said timer and opening said first contacts a second predetermined interval after starting of the running of said timer; and a second energizing circuit for said timer in parallel with said first energizing circuit and including contacts closed by said timer upon energization of the latter, said timer opening said last-named contacts at the end of said second predetermined time interval.

13. Apparatus for controlling transmission of electrical power from a power source to a load comprising, in combination, a photocell having a low resistance state responsive to a first periodically recurring ambient light level and a high resistance state responsive to a second periodically recurring ambient light level; a timer having an energizing circuit, said timer having an operating period less than the normal recurrence period of one of said ambient light levels; a relay, including an operating coil connected in series in a control circuit with said photocell and relay contacts included in said timer energizing circuit; said relay, responsive to one of said ambient light levels effective on said photocell, closing said timer energizing circuit to start running of said timer; first contacts operable by said timer during running thereof and controlling connection of the load to said source, said timer closing said first contacts a predetermined interval after starting of the running of said timer and opening said first contacts a second predetermined interval after starting of the running of said timer; and including switch means operatively associated with said timer and said relay and operable, responsive to running of said timer, to render said relay ineffective to control said timer energizing circuit; said switch means, at the end of the operating period of said timer, again rendering said relay effective to control said timer energizing circuit.

14. Apparatus for controlling transmission of electrical power from a power source to a load, as claimed in claim 13, including second contacts closed by said timer during running thereof and connected in shunt with said relay contacts in said timer energizing circuit; said switch means comprising third contacts operated by said timer and including in said control circuit, said third contacts being open during running of said timer and being closed at the end of the operating period of said timer.

References Cited

UNITED STATES PATENTS

| | | | |
|---|---|---|---|
| 2,617,972 | 11/1952 | Nutter | 318—443 |
| 2,640,958 | 6/1953 | Davis | 318—483 X |
| 2,788,482 | 4/1957 | Ray | 318—471 X |
| 2,859,960 | 11/1958 | Magondeaux | 317—124 X |
| 2,922,929 | 1/1960 | Cooper et al. | 318—480 X |
| 3,024,372 | 3/1962 | Seele | 307—141.8 X |
| 3,083,319 | 3/1963 | Tiemann | 307—117 X |
| 3,240,960 | 3/1966 | Woodward | 307—117 |

ORIS L. RADER, *Primary Examiner.*

T. B. JOIKE, *Assistant Examiner.*